(12) United States Patent
Christensen et al.

(10) Patent No.: US 8,799,036 B1
(45) Date of Patent: Aug. 5, 2014

(54) SYSTEMS AND METHODS FOR ANALYZING VEHICLE OPERATION DATA TO FACILITATE INSURANCE POLICY PROCESSING

(71) Applicant: State Farm Mutual Automobile Insurance Company, Bloomington, IL (US)

(72) Inventors: Scott T. Christensen, Gibson City, IL (US); Christopher E. Gay, Dallas, TX (US); Gregory Hayward, Bloomington, IL (US); Steven Cielocha, Bloomington, IL (US); Todd Binion, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 14/202,997

(22) Filed: Mar. 10, 2014

Related U.S. Application Data

(60) Provisional application No. 61/775,652, filed on Mar. 10, 2013.

(51) Int. Cl.
| | | |
|---|---|---|
| *G06Q 40/00* | (2012.01) | |
| *B60Q 1/00* | (2006.01) | |
| *G06Q 40/08* | (2012.01) | |

(52) U.S. Cl.
CPC ...... *G06Q 40/08* (2013.01); *B60Q 1/00* (2013.01); *G06Q 40/00* (2013.01)
USPC .............................. 705/4; 340/438; 340/439

(58) Field of Classification Search
None
See application file for complete search history.

(56) References Cited

U.S. PATENT DOCUMENTS

| | | | |
|---|---|---|---|
| 6,313,791 B1* | 11/2001 | Klanke ................ 342/357.75 |
| 7,343,306 B1* | 3/2008 | Bates et al. .................... 705/4 |
| 7,659,827 B2* | 2/2010 | Gunderson et al. .......... 340/576 |
| 7,724,145 B2* | 5/2010 | Batra et al. ................ 340/572.8 |
| 8,086,523 B1* | 12/2011 | Palmer .......................... 705/38 |
| 8,359,213 B2* | 1/2013 | Berg et al. ...................... 705/4 |
| 8,359,259 B2* | 1/2013 | Berg et al. .................... 705/37 |
| 8,407,139 B1* | 3/2013 | Palmer .......................... 705/38 |
| 8,489,433 B2* | 7/2013 | Altieri et al. .................... 705/4 |
| 8,686,844 B1* | 4/2014 | Wine ........................... 340/439 |
| 8,731,768 B2* | 5/2014 | Fernandes et al. .......... 701/32.3 |
| 2002/0111725 A1* | 8/2002 | Burge ........................... 701/29 |
| 2008/0018466 A1* | 1/2008 | Batra et al. ................ 340/572.1 |
| 2008/0065427 A1* | 3/2008 | Helitzer et al. .................. 705/4 |
| 2009/0002147 A1* | 1/2009 | Bloebaum et al. .......... 340/466 |
| 2009/0150023 A1* | 6/2009 | Grau et al. .................... 701/35 |
| 2009/0210257 A1* | 8/2009 | Chalfant et al. ................ 705/4 |

(Continued)

*Primary Examiner* — Gregory Johnson
(74) *Attorney, Agent, or Firm* — Marshall, Gerstein & Borun LLP; Randall G. Rueth

(57) ABSTRACT

Methods and systems for leveraging a plurality of sensor devices distributed in a geographical area to monitor vehicle usage for assessing, pricing, and provisioning distance-based vehicle insurance. One or more sensor devices may capture information associated with a vehicle and communicate the information to an insurance provider. In aspects, the insurance provider may analyze the information to determine a distance that the vehicle travels within a particular time period. Further, the insurance provider may determine a vehicle usage unit based on the distance traveled as well as provide various insurance coverage types to a customer associated with the vehicle. Based on a selected coverage type, the insurance provider may generate an insurance quote for a policy having an amount of the vehicle usage units and may facilitate a purchase transaction with the customer for the insurance policy.

20 Claims, 7 Drawing Sheets

(56) References Cited

U.S. PATENT DOCUMENTS

| | | | |
|---|---|---|---|
| 2011/0022421 A1* | 1/2011 | Brown et al. ................. 705/4 |
| 2011/0137685 A1* | 6/2011 | Tracy et al. .................. 705/4 |
| 2011/0161118 A1* | 6/2011 | Borden et al. ................ 705/4 |
| 2011/0213628 A1* | 9/2011 | Peak et al. ................... 705/4 |
| 2012/0021386 A1* | 1/2012 | Anderson et al. ............ 434/66 |
| 2012/0089423 A1* | 4/2012 | Tamir et al. .................. 705/4 |
| 2012/0190386 A1* | 7/2012 | Anderson ................. 455/456.3 |
| 2012/0197669 A1* | 8/2012 | Kote et al. .................... 705/4 |
| 2013/0018677 A1* | 1/2013 | Chevrette ..................... 705/4 |
| 2013/0046510 A1* | 2/2013 | Bowne et al. ............... 702/187 |
| 2013/0117050 A1* | 5/2013 | Berg et al. .................... 705/4 |
| 2013/0151064 A1* | 6/2013 | Becker et al. .............. 701/31.4 |
| 2013/0226624 A1* | 8/2013 | Blessman et al. ............ 705/4 |
| 2013/0262530 A1* | 10/2013 | Collins et al. .............. 707/812 |
| 2013/0297387 A1* | 11/2013 | Michael ....................... 705/13 |
| 2013/0325519 A1* | 12/2013 | Tracy et al. .................. 705/4 |
| 2013/0345896 A1* | 12/2013 | Blumer et al. ................ 701/1 |
| 2014/0012604 A1* | 1/2014 | Allen, Jr. ...................... 705/4 |
| 2014/0025401 A1* | 1/2014 | Hagelstein et al. .......... 705/4 |
| 2014/0046701 A1* | 2/2014 | Steinberg et al. ............ 705/4 |
| 2014/0058761 A1* | 2/2014 | Freiberger et al. ........... 705/4 |
| 2014/0089101 A1* | 3/2014 | Meller .................... 705/14.66 |
| 2014/0111647 A1* | 4/2014 | Atsmon et al. ............. 348/148 |

\* cited by examiner

SYSTEMS AND METHODS FOR ANALYZING VEHICLE OPERATION DATA TO FACILITATE INSURANCE POLICY PROCESSING

CROSS-REFERENCE TO RELATED APPLICATIONS

This application claims the benefit of U.S. Provisional Application No. 61/775,652, filed Mar. 10, 2013, which is incorporated by reference herein.

FIELD OF THE DISCLOSURE

The present disclosure generally relates to systems and methods for offering insurance policies and, more particularly, to platforms and techniques for analyzing vehicle operation data to generate insurance policy options and communicate the options to customers.

BACKGROUND

Vehicle or automobile insurance exists to provide financial protection against physical damage and/or bodily injury resulting from traffic accidents and against liability that could arise therefrom. Typically, a customer purchases a vehicle insurance policy for a policy rate having a specified term. In exchange for payments from the insured customer, the insurer pays for damages to the insured which are caused by covered perils, acts, or events as specified by the language of the insurance policy. The payments from the insured are generally referred to as "premiums," and typically are paid on behalf of the insured over time at periodic intervals. An insurance policy may remain (or have a status or state of) "in-force" while premium payments are made during the term or length of coverage of the policy as indicated in the policy. An insurance policy may "lapse" (or have a status or state of "lapsed"), for example, when premium payments are not being paid, when a cash value of a policy falls below an amount specified in the policy, or if the insured or the insurer cancels the policy.

Some policies may be based at least in part on an envisioned distance that the vehicle may travel during a specified term period (often six months). However, the distance is often an estimation that does not accurately reflect an actual distance traveled by the vehicle. Further, the amount of miles that a vehicle travels (and the time that the vehicle is in use) on a month-to-month or other periodic basis may vary significantly. For example, in some cases, a driver may only need a vehicle for a week-long period, or for a daily commute, or for other usages. Therefore, conventional vehicle insurance policies that are priced according to a specified term may not accurately reflect the actual mileage or time that a vehicle is driven, metrics that are difficult to estimate, determine, and/or verify.

Accordingly, there is an opportunity for systems and methods to more effectively and efficiently price vehicle insurance policies. In particular, there is an opportunity for systems and methods to process vehicle operation data to generate insurance policy offers that are more tailored to the intended and actual use of a vehicle.

SUMMARY

In an embodiment, a computer-implemented method of offering vehicle insurance for a vehicle is provided. The method includes receiving, within a time period, (1) a first indication of the vehicle from a first sensor device at a first location and (2) a second indication of the vehicle from a second sensor device at a second location, and calculating, by a processor, a distance traveled by the vehicle based on the first location and the second location. The method further includes determining, by the processor, a vehicle usage unit based on the distance traveled, and providing, to a customer associated with the vehicle, an option to purchase an insurance policy based at least in part on the vehicle usage unit.

In another embodiment, a system for offering vehicle insurance for a vehicle is provided. The system includes a communication module adapted communicate data, a memory adapted to store non-transitory computer executable instructions, and a processor adapted to interface with the communication module. The processor is configured to execute the non-transitory computer executable instructions to cause the processor to receive, via the communication module within a time period, (1) a first indication of the vehicle from a first sensor device at a first location and (2) a second indication of the vehicle from a second sensor device at a second location, and calculate a distance traveled by the vehicle based on the first location and the second location. The processor is further configured to determine a vehicle usage unit based on the distance traveled, and provide, to a customer associated with the vehicle via the communication module, an option to purchase an insurance policy based at least in part on the vehicle usage unit.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
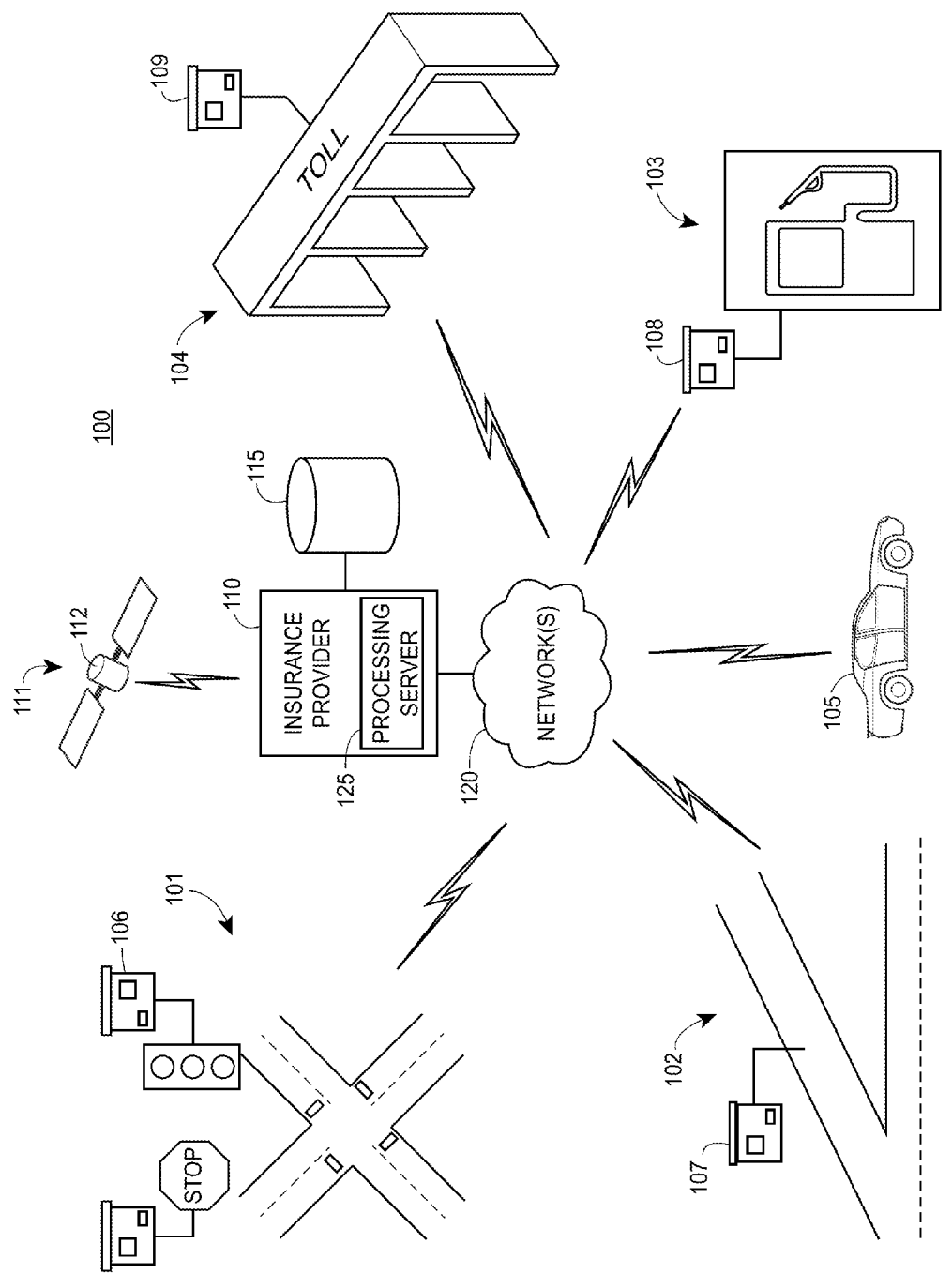
FIG. 1 depicts an example environment including components and entities associated with collecting and processing vehicle operation data in accordance with some embodiments.

The novel systems and methods disclosed herein relate generally to processing new or existing vehicle insurance policies. According to certain aspects, when driving on roads, highways, and the like, vehicles may pass one or more "check points" or "premises" that may be equipped with vehicle detection equipment such as still cameras, video cameras, sensors, and/or the like. The vehicle detection equipment is configured to capture information about the vehicles (e.g., in the form of image data or other data) and communicate the information to a remote insurance provider. According to embodiments, vehicle detection equipment at multiple premises may capture the same vehicle with a time period or window. Upon receiving respective information from respective vehicle detection equipment, the insurance provider may process the information to identify the vehicle (e.g., via the vehicle's license plate, a transponder, or other identification), and determine a distance that the vehicle traveled within a time period of the captured information. Of course, the insurance provider may collect and reconcile additional driving data associated with the vehicle as new information is received from the sensors and/or premises.

The insurance provider may determine a "vehicle usage unit" that can be based on the distanced traveled and/or the time period, where the vehicle usage unit itself may be distance-based or time-based. For example, the insurance provider can determine that a particular vehicle makes frequent short trips of about 30 minutes each. For further example, the insurance provider can determine that another vehicle travels a distance of about 100 miles every Saturday. The insurance provider may use the vehicle usage unit to generate or identify specific insurance coverage types for insuring the vehicle, and communicate the coverage types to a customer associated with the vehicle. In some embodiments, the customer may be an existing customer having an insurance policy with the insurance provider, whereby the insurance policy may be in addition to or an alternative to an existing insurance policy that the customer has with the insurance provider. In other embodiments, the customer may be a prospective customer without an insurance policy with the insurance provider. Based on a selected coverage type by the customer, the insurance provider may generate a quote for an insurance policy offering a certain amount of vehicle usage units for purchase at a policy rate. The customer is able to optionally modify various terms of the insurance policy as well as purchase the insurance policy.

The systems and methods therefore enable customers to purchase insurance policies that are more tailored to the customer's driving patterns, driving habits, or actual amount of driving. The instances of the customers overpaying for vehicle insurance are therefore reduced. Further, by offering insurance policies based on vehicle usage units, the insurance companies may be able to attract new customers or encourage existing customers to purchase additional (or alternative) insurance.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted as limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Accordingly, the term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy, or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to vehicle or automobile insurance policies, it should be appreciated that an insurance provider may offer or provide one or more different types of insurance policies. Other types of insurance policies may include, for example, homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," and "customer" are used interchangeably herein to refer to a person, party, or entity (e.g., a business or other organizational entity) that is covered by the insurance policy, e.g., whose insured article or entity (e.g., property, life, health, auto, home, business) is covered by the policy. A "potential customer," as used herein, is a person, party, or entity that is not a current customer but may become a customer upon purchase of a policy.

Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

FIG. 1 depicts an example environment 100 associated with collecting and processing vehicle operation data from sensor devices. Although FIG. 1 depicts certain entities, components, and devices, it should be appreciated that additional or alternate entities and components are envisioned.

As illustrated in FIG. 1, the environment 100 includes several premises with sensor devices configured to capture various vehicle data and information. According to embodiments, the vehicle data and information may include any of the following: an identification of the vehicle, a distance traveled, a time traveled, a day of the week, a time of day, speed data, roadways traveled, routes traveled, intersections crossed, weather during travel, traffic volume during travel, places parked, or other similar data. The premises of the environment 100 include an intersection 101, a highway or freeway entrance ramp 102, a gas station 103, a toll plaza 104, and an aerial object 111. Each of the example premises (101, 102, 103, 104, 111) may include one or more sensor devices (106, 107, 108, 109, 112) such as a still camera configured to capture images, a video camera configured to capture videos, transponder detection equipment, and/or other sensor devices. The sensor devices 106, 107, 108, 109, 112 may be installed at any location of the respective premise or object. For example, the sensor device 108 may be installed underneath a canopy of the gas station 103. For further example, multiple of the sensor device 109 may be installed at the exits of respective lanes of the toll plaza 104. The aerial object 111 may be any machine or component configured to elevate above an environment and maintain its position therefrom. For example, the aerial object 111 may be a satellite, an aircraft, a helicopter, and/or the like.

According to embodiments, each of the sensor devices 106, 107, 108, 109, 112 is configured to capture, sense, or otherwise detect information about the use of vehicles (such as vehicle 105) that are located at, passing through, within visible or detectable range of, or otherwise in a general vicinity of the respective premise 101, 102, 103, 104, 111. For example, the sensor device 106 can capture an image of the vehicle 105 when the vehicle 105 is stopped at or passing through the intersection 101. For further example, the sensor device 108 can detect a transponder of the vehicle 105 when the vehicle 105 is filling up for gas at the gas station 103. Further, for example, the sensor device 112 positioned on a helicopter can capture information about the vehicle 105 driving down a highway. The sensor devices 106, 107, 108, 109, 112 may be positioned or installed to be able to capture or sense identifying information associated with the vehicle 105, such as a license plate or other type of identification. Further, the sensor devices 106, 107, 108, 109, 112 may each have an associated location, such as a GPS location, nearest intersection, nearest landmark, nearest roadway, or other location indication. Although only one vehicle 105 is depicted in FIG. 1, it should be appreciated that the sensor devices 106, 107, 108, 109, 112 may capture or sense information about multiple vehicles.

The sensor devices 106, 107, 108, 109, 112 can be configured to communicate resulting information to an insurance provider 110 via a network 120. The network 120 can facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, and/or others). The insurance provider 110 can be any individual, group of individuals, company, corporation, or other type of entity that can issue insurance policies for customers, such as a vehicle insurance policy for the vehicle 105. According to embodiments, the insurance provider 110 can include one or more processing server(s) 125 configured to facilitate the functionalities as discussed herein. Although FIG. 1 depicts the processing server 125 as a part of the insurance provider 110, it should be appreciated that the processing server 125 can be separate from (and connected to or accessible by) the insurance provider 110.

Upon receipt of the information from the sensor devices 106, 107, 108, 109, 112, the insurance provider 110 (and specifically the processing server 125) can examine the information to identify the source (i.e., the sensor device or associated premises), the associated location of the source, and a timestamp. Further, the processing server 125 can analyze the information to identify identification information associated with the vehicle 105. For example, the processing server 125 can employ various optical character recognition (OCR) techniques to identify a license plate number for the vehicle 105. Accordingly, by examining and analyzing the received information, the processing server 125 can identify a location of an identified vehicle at a particular time.

The embodiments herein envision additional channels and techniques for capturing and retrieving location-based data for vehicles. In one embodiment, the vehicle 105 may be equipped with an on-board device (e.g., an OEM in-dash device) configured to transmit its location (and therefore a location of the vehicle 105) to the insurance provider 110 via the network 120. The transmission can include an electronic serial number (ESN) of the device so that the insurance provider 110 may identify the vehicle 105. In another embodiment, the insurance provider 110 may use triangulation or other location-based techniques on data received from the network 120, such as 4G network data or other network data (e.g., local area network data) that originates from the vehicle 105 or from a device traveling in, present in, or otherwise associated with the vehicle 105. The insurance provider 110 can then analyze the data to identify the vehicle's 105 location as well as time data, and add the identified data to the data received from the sensor devices 106, 107, 108, 109, 112 for processing purposes.

The processing server 125 can be coupled to a database 115 configured to store data associated with the vehicle 105. In particular, the database 115 can store and maintain one or more information records for one or more respective vehicles, ordered by the identification of the vehicle (e.g., the license plate of the vehicle). Each information record may include locations where the associated vehicle has been as well as associated timestamps corresponding to when the vehicle was at the locations. Therefore, the processing server 125 can examine the information record to estimate a distance that the vehicle 105 has traveled during an associated time period. The processing server 125 can update the information record as more information and data associated with the vehicle 105 is received from the sensor devices 106, 107, 108, 109, 112.

Figure 2:
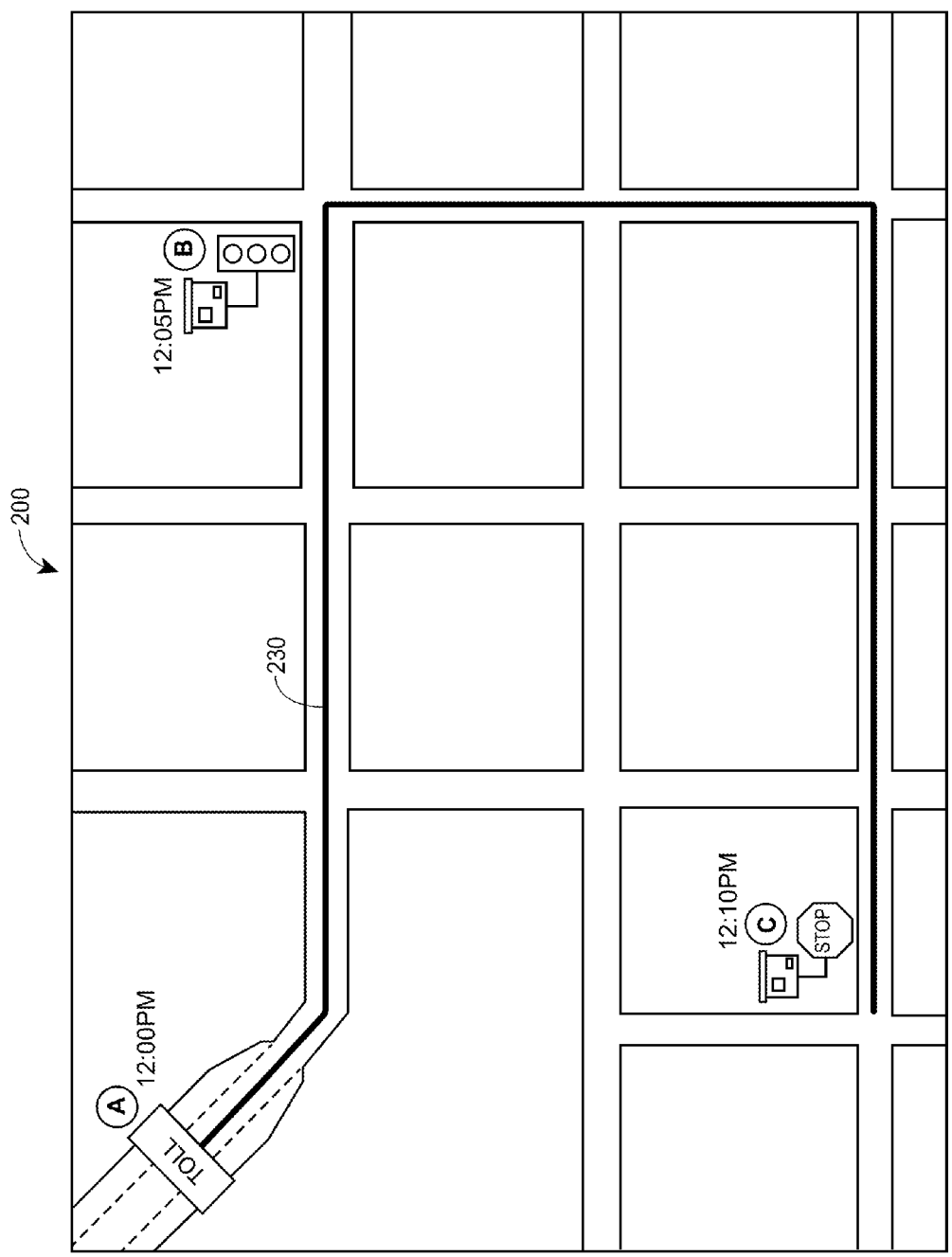
FIG. 2 depicts an example representation of a route traversed by a vehicle in accordance with some embodiments.

According to embodiments, the processing server 125 can generate a map or other type of visualization that indicates where the vehicle 105 has been and to estimate a distance traveled by the vehicle 105, based on the received information. Referring to FIG. 2, illustrated is an example map 200 that indicates locations at which a vehicle has been. The map 200 depicts three locations or premises that are equipped with a sensor device: a toll plaza ("A"), a stop light ("B"), and a stop sign ("C"). It can be assumed that the respective sensor devices of the toll plaza, stop light, and stop sign captured or sensed information of the vehicle at various times, and communicated the captured information to the insurance provider 110. The processing server 125 can use location data associated with the locations to generate the map 200 (e.g., by using mapping software, interfacing with an existing mapping API, or using other techniques). In particular, the processing server 125 can generate the map 200 using the locations and the times at which the vehicle was present at the locations.

In the particular example depicted in FIG. 2, the processing server 125 can examine the received information to determine that the vehicle was at the toll plaza at 12:00 PM, the stop light at 12:05 PM, and the stop sign at 12:10 PM. The processing server 125 can optionally populate the map 200 with the respective locations and times. Further, the processing server 125 can determine a likely route 230 that the vehicle traversed during the particular time period, based on the visited locations and the associated times. It should be appreciated that the processing server 125 can determine the likely route 230 using various algorithms based on information capture times and locations, direction information (e.g., one-way streets), and other information. Based on the likely route 230, the processing server 125 can also determine or estimate a distance that the vehicle traveled during the time period of the captured information. Of course, at any point, the processing server 125 can update the map 200 and the likely route 230 (as well as the estimated distance) as more information is received from sensor devices. Further, the processing server 125 can account for data related to the vehicle travel during other days and in other locations. For example, the processing server 125 can determine that the vehicle frequently travels along the likely route 230 at similar times on similar days.

According to embodiments, the processing server 125 may determine a "vehicle usage unit" that is based on the estimated distance that the vehicle travels during the time period. In some cases, the vehicle usage unit may be time-based (e.g., 30 minutes, 1 hour, 1 day, or other time periods). In other cases, the vehicle usage unit may be distance-based (e.g., a half mile, 1 mile, 100 miles, or other distances). The processing server 125 may incorporate various algorithms and/or techniques to calculate the vehicle usage unit, and can consider multiple trips for the same vehicle. For example, if a vehicle travels a distance of three (3) miles on a round-trip commute (i.e., two 1-way trips) that combined takes fifteen (15) minutes, over five (5) consecutive days, the processing server 125 may determine that the appropriate vehicle usage unit is three (3) miles. For further example, if a vehicle drives for approximately one (1) hour each Saturday, but with differing travel distances, the processing server 125 may determine that the appropriate vehicle usage unit is one (1) hour. Moreover, for example, if the vehicle sporadically travels a distance of 100 miles about once a month, the processing server 125 may determine that the appropriate vehicle usage is 100 miles. It should be appreciated that the processing server 125 can determine multiple options for a vehicle usage unit for the same vehicle.

As illustrated in FIG. 1, the processing server 125 may be configured to communicate with the vehicle 105 via the network 120. In particular, in some cases, the processing server 125 may communicate with a device associated with the vehicle 105, such as an on-board device (OBD) of the vehicle 105. In other cases, the processing server 125 may communicate with a device of a customer associated with the vehicle 105 (e.g., a smartphone of a driver of the vehicle 105). The processing server 125 may use the collected and determined data and information to communicate with the device associated with the vehicle 105 to facilitate a purchase of insurance coverage. In particular, a customer may use the device to view insurance policy options, request any modifications, and purchase a desired insurance policy.

According to embodiments, the processing server 125 may communicate indications of various coverage types to the vehicle 105. Exemplary coverage types may include "recommended," "economy," and "minimal coverage," whereby each coverage type offers a different amount of coverage, different term, and/or the like. For example, recommended coverage may offer more coverage than economy and minimal coverage. It should be understood that some aspects of the coverage types may be controlled by applicable state regulations. The customer or driver associated with the vehicle 105 may select one of the provided coverage types and the device may communicate the selection to the processing server 125.

After receiving the coverage type selection, the processing server 125 can determine a quote for a vehicle insurance policy. The quote accounts for the coverage type selection and includes an amount of vehicle usage units for purchase. The quote can include a policy rate identifying a cost per vehicle usage unit. For example, the quote can indicate a cost of $0.05 per mile, $1.00 per 15 minutes, etc. In some embodiments, the policy rate can be based on various customer (i.e., vehicle operator) and vehicle information that may affect the risk of insuring the customer, such as a driving record of the customer, the make, model, year, and/or condition of the vehicle, and/or other underwriting data. Accordingly, the cost per vehicle usage unit includes various factors based on a risk assessment. After determining or generating the quote, the processing server 125 can communicate the quote to the device associated with the vehicle 105.

The quote further indicates multiple pre-calculated items representative of a total number of vehicle usage units for purchase at the policy rate. Generally, the less (or more) coverage that a customer desires, the fewer (or more) vehicle usage units will be included in the quote and the more (or less) each vehicle usage unit will cost. For example, one vehicle insurance quote may offer 5000 miles of coverage for $250 (i.e., $0.05/mile*5000), while another vehicle insurance quote may offer 600 minutes of coverage for $40 (i.e., $1.00/15 min*40). It should be understood that various modifications may be made in the calculations to provide, for example, an incentive for a customer to purchase additional miles. For example, the policy rate may be reduced to $0.04/mile upon the purchase of 10,000 miles. The customer may use the device to select a policy item (i.e., an amount of vehicle usage units) for purchase and the device may communicate the selection to the processing server 125.

The processing server 125 and the device associated with the vehicle 105 may facilitate a purchase transaction for an insurance policy according to the selected item. It should be appreciated that the processing server 125 and the device may employ any checkout or payment processing technique to facilitate the purchase transaction. In cases in which the vehicle usage unit is distance-based, the insurance policy may include an expiration odometer value that is calculated as the sum of the current odometer reading for the vehicle 105 and the total number of distance units included in the selected policy item. In cases in which the vehicle usage unit is time-based, the insurance policy may include an expiration time defined as the total number of time units included in the selected item added to the current time. However, it should be appreciated that the time units may be spread out over multiple time periods. For example, certain time units may be used on one day while additional time units may be used on another day, regardless of the elapsing of the current time. The processing server 125 may store or record the expiration odometer value or the expiration time.

Although the embodiments as described relate to initiating or creating a new insurance policy for an existing or potential customer, it should be appreciated that the techniques may also be used to update an existing insurance policy for an existing customer. In particular, the processing server 125 may receive the information from the sensor devices and perform the distance and time calculations based on the image data. Further, the processing server 125 can locate or retrieve an existing insurance policy associated with the vehicle 105 (or an operator of the vehicle 105), and generate a quote that may be in addition to or in lieu of the existing insurance policy. The processing server 125 may provide the quote to the device associated with the vehicle 105 and facilitate any subsequent purchase transaction, as detailed herein. In further embodiments, the processing server 125 may manage a renewal of a purchased insurance policy, with the same or modified parameters of the purchased insurance policy.

Figure 3:
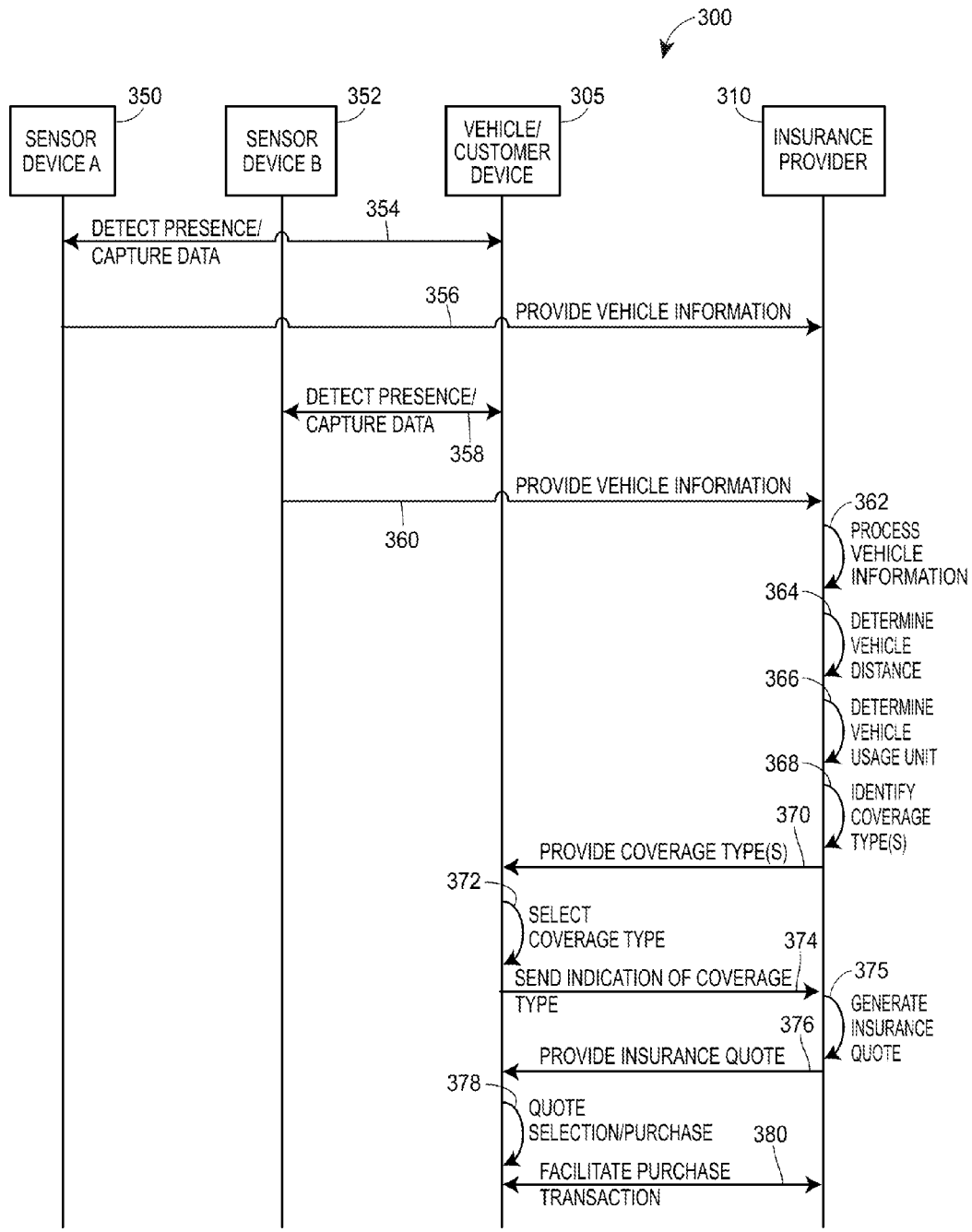
FIG. 3 depicts an example diagram associated with analyzing vehicle operating data to facilitate insurance policy processing in accordance with some embodiments.

Referring to FIG. 3, illustrated is a signal diagram 300 associated with analyzing vehicle operating data to facilitate insurance policy processing for vehicles. In particular, FIG. 3 includes a sensor device A 350 (such as one of the sensor devices 106, 107, 108, 109 as described with respect to FIG. 1), a sensor device B 352 (such as one of the sensor devices 106, 107, 108, 109 as described with respect to FIG. 1), an insurance provider 310 (such as the insurance provider 110 as described with respect to FIG. 1), and a vehicle/customer device 305 (such as a device associated with the vehicle 105 as described with respect to FIG. 1). It should be appreciated that the vehicle/customer device 305 may include any electronic device associated with the vehicle (e.g., an on-board dash system) and/or any electronic device associated with a user/driver of the vehicle (e.g., a driver's smartphone).

The signal diagram 300 may begin when the vehicle 305, at a particular time, enters a proximity or detectable range of sensor device A 350 and sensor device A 350 captures (354) information associated with the vehicle 305. For example, sensor device A 350 may capture an image of or otherwise sense the license plate of the vehicle 305. Sensor device A 350 may provide (356) the resulting information of the vehicle 305 (and the time that the information was captured) to the insurance provider 310 via a network connection. At a subsequent time, the vehicle 305 enters a proximity or detectable range of sensor device B 352 and sensor device B 352 captures (358) information associated with the vehicle 305. For example, sensor device B 352 may capture an image of or otherwise sense the license plate of the vehicle 305. Sensor device B 352 may provide (360) the information of the vehicle 305 (and the time that the information was captured) to the insurance provider 310 via a network connection.

The insurance provider 310 may process (362) the received vehicle information. For example, the insurance provider 310 may perform one or more OCR techniques on any image data to identify a license plate number or other identifying indication of the vehicle 305. For further example, the insurance provider 310 may examine the vehicle information to identify an ESN of the vehicle 305. The insurance provider 310 may also determine that the same license plate is identified in two or more different vehicle information datasets, and accordingly that the associated vehicle has been located at the two or more associated locations of the two or more sensor devices (e.g., the vehicle 305 has been captured by both sensor device A 350 and sensor device B 352).

The insurance provider 310 may determine (364) the distance that the vehicle 305 has traveled within a time period. In particular, the time period may be defined by the time between when sensor device A 350 captures the vehicle 305 and when sensor device B 352 captures the vehicle 305. Further, the insurance provider 310 can estimate a route traveled by the vehicle 305 and determine the distance based on the respective locations of the sensor device A 350 and the sensor device B 352. Of course, the insurance provider 310 may calculate the speed of the vehicle 305, as well as other metrics, based on the time values and the distance calculation.

The insurance provider 310 may further determine (366) a vehicle usage unit based on the distance traveled and/or the time period. In embodiments, the vehicle usage unit may be time-based, distance-based, or a combination of time and distance. For example, if the distance traveled is ten (10) miles, the vehicle usage unit may be five (5) miles, ten (10) miles, or other distances. For further example, if the time period is 2 hours, the vehicle usage unit may be fifteen (15) minutes, one (1) hour, two (2) hours, or other amounts. As described herein, the insurance provider 310 may also account for multiple trips (and multiple image capturing instances) by the vehicle 305 to determine the vehicle usage unit.

The insurance provider 310 may identify (368) various coverage types (e.g., "recommended," "economy," "minimal coverage," etc.) associated with the vehicle usage unit and provide (370) indications of the coverage types to the vehicle/customer device 305 via a network connection. The vehicle/customer device 305 can present the coverage types to the customer and the customer may select (372) a desired coverage type based on how much insurance coverage the customer desires. According to embodiments, the customer may be an existing customer or a prospective customer.

The vehicle/customer device 305 may send (374) an indication of the selected coverage type to the insurance provider 310 via a network connection. Responsive to receiving the selected coverage type, the insurance provider 310 may determine or generate (375) an insurance quote and provide (376) the insurance quote to the vehicle/customer device 305 via a network connection. In particular, the insurance quote may include options associated with an amount of vehicle usage units and a price per vehicle usage unit, and may be based on the selected coverage type. For example, if a determined vehicle usage unit is ten (10) miles and the customer selects a "recommended" coverage type, the insurance quote may offer fifty (50) vehicle usage units of ten (10) miles each and at a cost of $2.20 per vehicle usage unit. Of course, it should be appreciated that the customer may use the vehicle/customer device 305 to modify or propose a modification to the amount of vehicle usage units for purchase, which may or may not trigger a modified cost per vehicle usage unit. Further, it should be appreciated that the quote may be associated with an insurance policy that may be in addition to or a replacement for an existing insurance policy of the customer.

If the customer wishes to purchase the proposed insurance quote, the customer may select (378) to purchase the offered insurance quote. The vehicle/customer device 305 and the insurance provider 310 may then facilitate (380) a purchase transaction for the insurance policy. It should be appreciated that the purchase transaction may be facilitated by any known technique. For example, the customer may input payment information into an application executing on the vehicle/customer device 305. For further example, a representative of the insurance provider 310 may call the customer to facilitate the purchase transaction. Further, for example, the insurance provider 310 may process the purchase using customer information that is already stored (such in cases in which the customer has an existing insurance policy). After the purchase transaction is complete, the insurance policy may be deemed active.

FIGS. 4A-4D illustrate example interfaces associated with insurance policy processing. A vehicle or a customer device (e.g., an on-board dash system, a smartphone, etc.) may be configured to display the interfaces and receive selections and inputs via the interfaces. For example, a dedicated application that is configured to operate on the vehicle or consumer device may display the interfaces. It should be appreciated that the interfaces are merely examples and that alternative or additional content is envisioned.

Figure 4A:
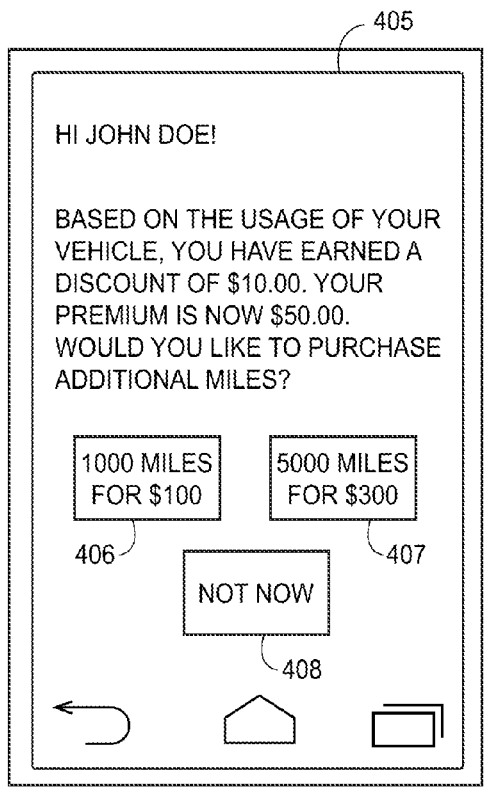
FIGS. 4A-4D depict example interfaces associated with insurance policy processing in accordance with some embodiments.

FIG. 4A illustrates an interface 405 that details a message related to initiating insurance purchasing functionality for an existing customer "John Doe." According to embodiments, the vehicle/customer device may display the interface 405 as a push-type notification or upon a user initiating an associated insurance application. Further, the information of the interface 405 may be received from an insurance provider. As illustrated in FIG. 4A, the interface 405 informs the customer of an identified driving pattern, as well as discount amount earned and an updated insurance premium. The interface 405 further notifies the customer of the amount of miles remaining on the existing insurance policy. The interface 405 further enables the customer to select to initiate purchasing additional miles via a selection 406 (1000 miles for $100) or a selection 407 (5000 miles for $300), or to decline purchasing additional miles via a "not now" selection 408.

Figure 4B:
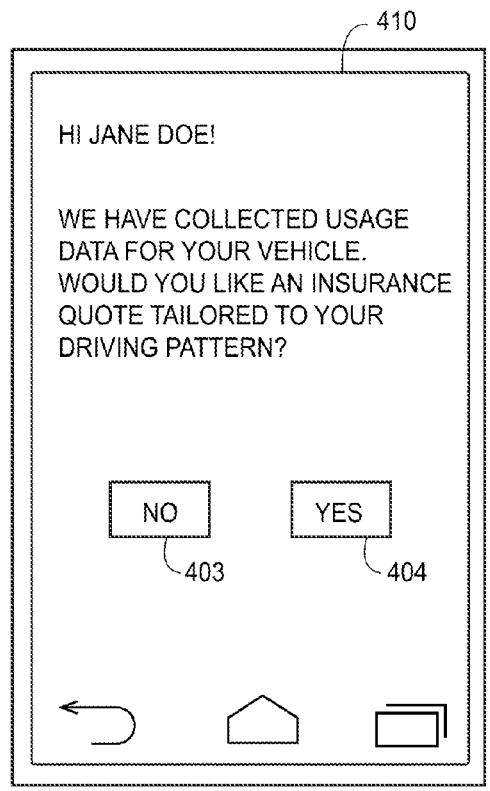

FIG. 4B illustrates an interface 410 that details a message related to initiating insurance purchasing functionality for a prospective customer "Jane Doe." According to embodiments, the vehicle/customer device may display the interface 410 as a push-type notification or upon a user initiating an associated insurance application. Further, the information of the interface 410 may be received from an insurance provider. As illustrated in FIG. 4B, the interface 410 informs the prospective customer of an identified driving pattern, and enables the user to select to view various insurance quotes tailored to the identified driving pattern via a "yes" selection 404 and a "no" selection 403.

Figure 4C:
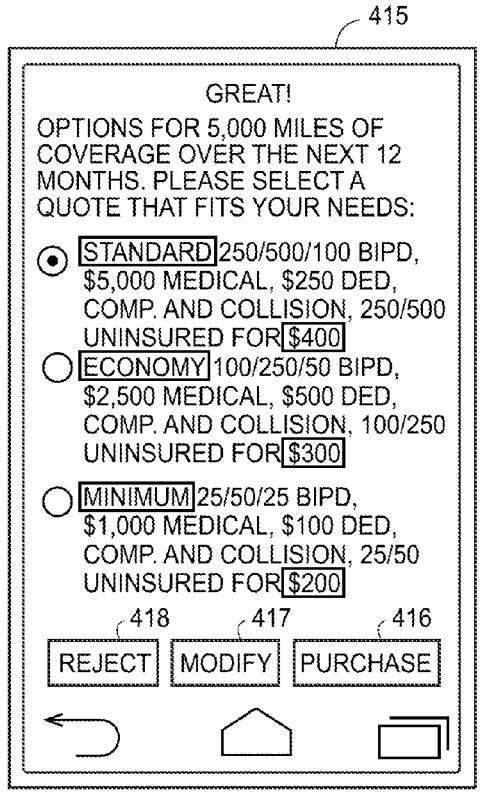

If the user selects the "yes" selection 404, the vehicle/customer device may display an interface 415 as illustrated in FIG. 4C. The interface 415 indicates quotes for various coverage types tailored to different insurance policies that the customer may wish to purchase (as shown: "standard," "economy," and "minimum"), and enables the customer to selected a quote corresponding to a desired coverage type. The interface 415 further includes a "purchase" selection 416, a "modify" selection 417, and a "reject" selection 418. If the user selects the purchase selection 416, the vehicle/customer device may initiate purchase transaction functionality that enables the user to purchase an insurance policy corresponding to the selected quote. The modify selection 417 enables the user to select to modify the quote. In some embodiments, the user may select to modify the miles, time period, coverage type, or any other information indicated in the interface 415. The user may wish to modify other information which may or may not require approval by the insurance provider and may or may not result in cost modifications. The reject selection 418 enables the user to select to reject the policy, return to a previous screen, quit the application, or proceed to another similar functionality.

Figure 4D:
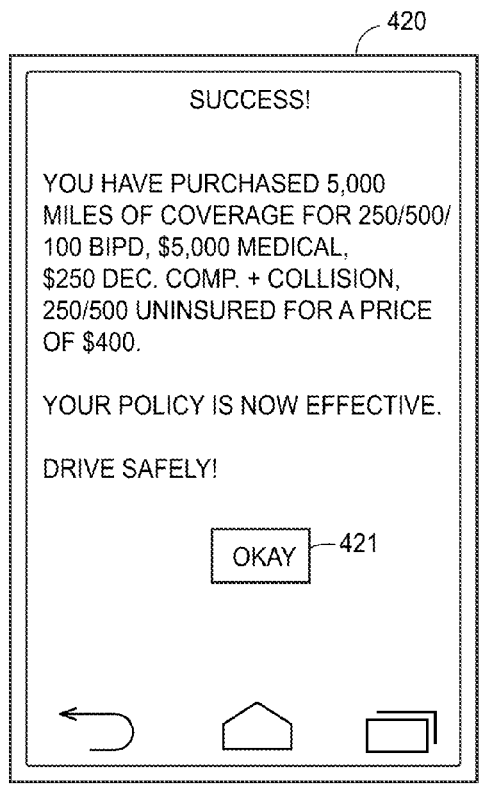

FIG. 4D illustrates an interface 420 indicating a success message, whereby the success message indicates that the insurance policy purchase was completed, and also identifies some terms of the insurance policy. The interface 420 also includes an "okay" selection 421 that, when selected, may dismiss the interface 420 and/or perform other functionalities.

Figure 5:
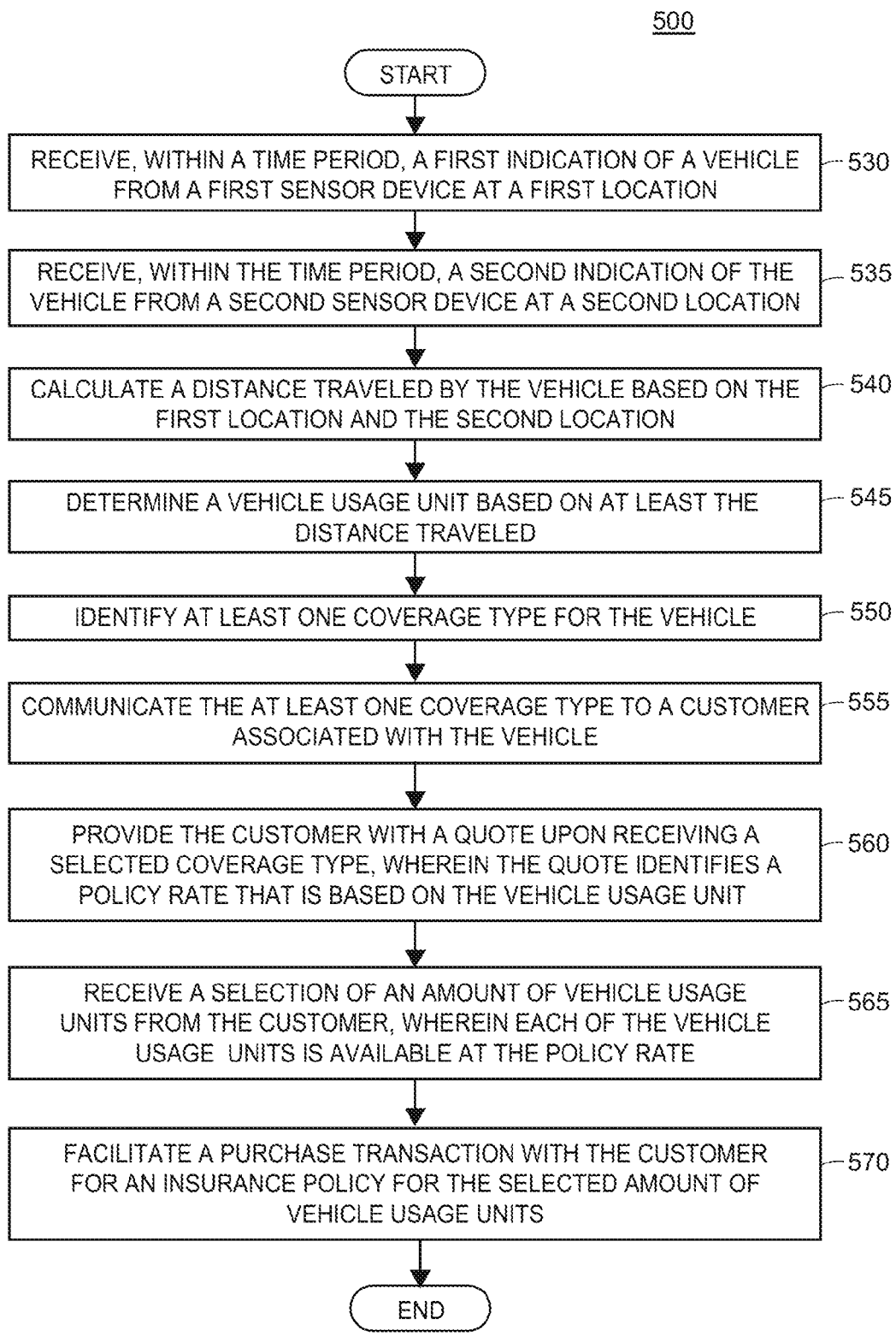
FIG. 5 depicts a flow diagram associated with analyzing vehicle operating data to facilitate insurance policy processing claims in accordance with some embodiments.

Referring to FIG. 5, depicted is a block diagram of an example insurance policy purchasing technique 500 that may be facilitated between the insurance provider 110 (and specifically the processing server 125) as depicted in FIG. 1 and customer associated with a vehicle. The insurance provider can receive (block 530), within a time period, a first indication (or otherwise a first set of usage information) of the vehicle from a first sensor device at a first location. In embodiments, the insurance provider can receive the first indication at the beginning of the time period. The insurance provider can also receive (block 535), within the time period, a second indication (or otherwise a second set of usage information) of the vehicle from a second sensor device at a second location. In embodiments, the insurance provider can receive the second indication at the end of the time period. For example, the received first and second indications may be image data associated with separate images, and the insurance provider may perform an OCR technique on the images to identify the vehicle (e.g., via a license plate included in the images). Of course, other sensor information is envisioned as discussed herein.

The insurance provider can calculate (block 540) a distance traveled by the vehicle based on the first location and the second location (or otherwise on the first set of usage information and the second set of usage information). In particular, the insurance provider may generate or access a map of roadway(s) between the first location and the second location, and may estimate the distance based on a shortest route (or other route) between the first location and the second location. The insurance provider can determine (block 545) a vehicle usage unit based on at least the distance traveled. In embodiments, the vehicle usage unit may further be based on the time period. As discussed herein, the vehicle usage unit may be distance-based or time-based, or a combination of distance and time. The insurance provider can identify (block 550) at least one insurance coverage type for the vehicle. The insurance coverage type may be related to a level of insurance that the consumer may desire for operating the vehicle (e.g., minimal, maximum, recommended, etc.), whereby each insurance coverage type may include a different coverage level.

The insurance provider can communicate (block 555) the at least one insurance coverage type to the customer associated with the vehicle. In particular, the insurance provider may interface with a vehicle- or customer-based device (e.g., via an application installed thereon) to provide an indication of the at least one coverage type. The customer may interact with the vehicle- or customer-based device to select a desired insurance coverage type and communicate the selection to the insurance provider.

Upon receipt of the selected coverage type, the insurance provider can provide (block 560) the customer with a quote that identifies a policy rate based on the vehicle usage unit. In some embodiments, the quote may also indicate a selectable amount of vehicle usage units as well as a total cost of the policy. Accordingly, the customer may select a desired amount of coverage available at the policy rate and communicate the selection so that the insurance provider receives (block 565) the selection. The insurance provider can facilitate (block 570) a purchase transaction with the customer for an insurance policy for the selected amount of vehicle usage units. In some embodiments, the purchase transaction may be facilitated via the vehicle- or customer-based device, or via other communication channels. Responsive to completing the purchase transaction, the insurance policy may be deemed active. Further, in some embodiments, the insurance provider may provide an electronic proof of insurance card to the customer.

Figure 6:
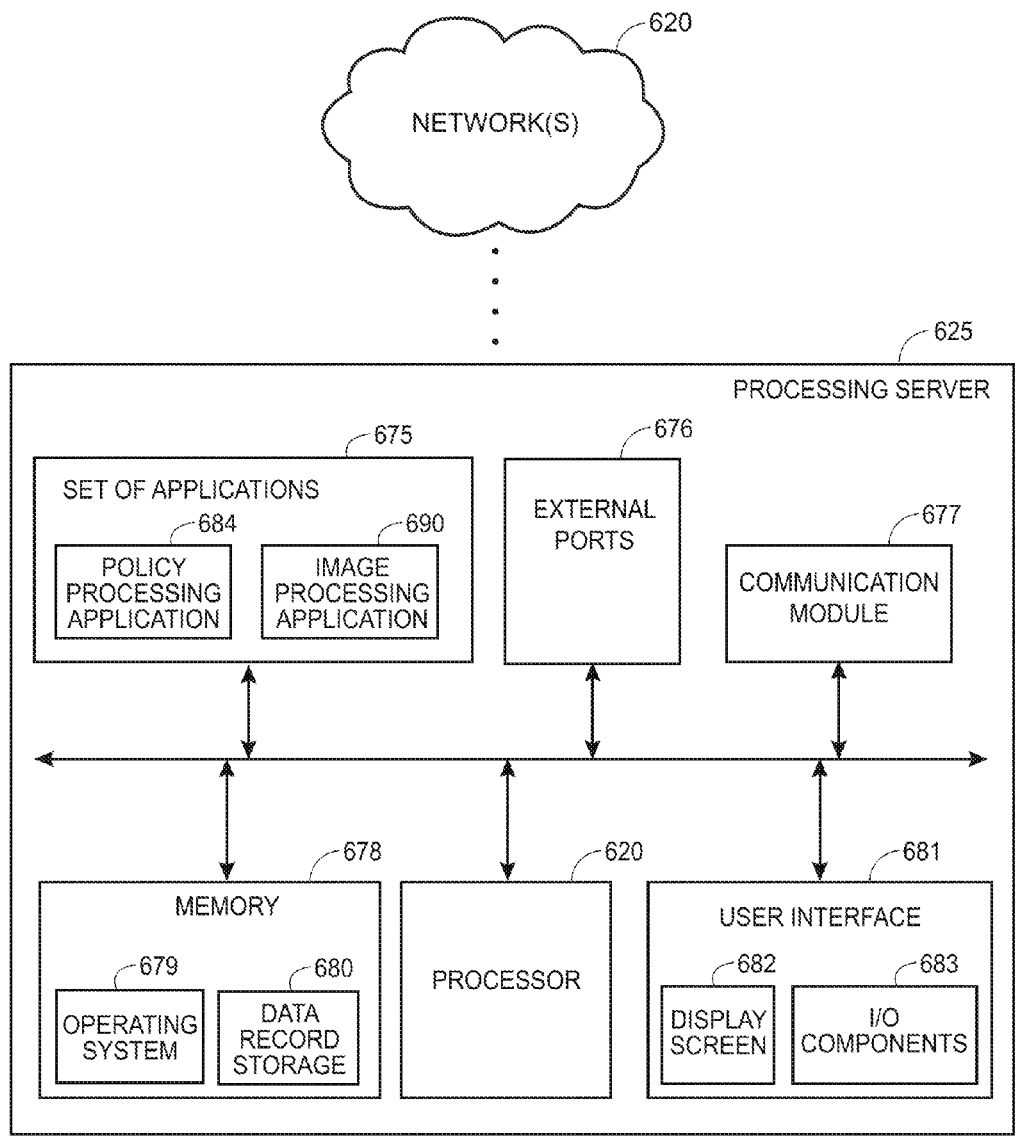
FIG. 6 is a block diagram of a processing server in accordance with some embodiments.

FIG. 6 illustrates a diagram of an example processing server 625 (such as the processing server 125 discussed with respect to FIG. 1) in which the functionalities as discussed herein may be implemented. It should be appreciated that the processing server 625 can be associated with an insurance provider, as discussed herein.

The processing server 625 can include a processor 620 as well as a memory 678. The memory 678 can store an operating system 679 capable of facilitating the functionalities as discussed herein as well as a set of applications 675 (i.e., machine readable instructions). For example, one of the set of applications 675 can be a policy processing application 684 configured to facilitate the offering and purchase of an insurance policy, and another of the set of applications 675 can be an image processing application 690 configured to analyze image data. It should be appreciated that other applications are envisioned.

The processor 620 can interface with the memory 678 to execute the operating system 679 and the set of applications 675. According to embodiments, the memory 678 can also include a data record storage 680 that stores location and operating information associated with a plurality of vehicles. The policy processing application 684 may interface with the data record storage 680 to retrieve relevant information that the policy processing application 684 may use to determine vehicle usage units and generate insurance policies. The memory 678 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The processing server 625 can further include a communication module 677 configured to communicate data via one or more networks 620. According to some embodiments, the communication module 677 can include one or more transceivers (e.g., WWAN, WLAN, and/or WPAN transceivers) functioning in accordance with IEEE standards, 3GPP standards, or other standards, and configured to receive and transmit data via one or more external ports 676. For example, the communication module 677 can receive vehicle data from sensor devices via the network 620. The processing server 625 may further include a user interface 681 configured to present information to a user and/or receive inputs from the user. As shown in FIG. 6, the user interface 681 includes a display screen 682 and I/O components 683 (e.g., ports, capacitive or resistive touch sensitive input panels, keys, buttons, lights, LEDs, speakers, microphones). According to embodiments, the user may access the processing server 625 via the user interface 681 to process insurance policies and/or perform other functions. In some embodiments, the processing server 625 can perform the functionalities as discussed herein as part of a "cloud" network or can otherwise communicate with other hardware or software components within the cloud to send, retrieve, or otherwise analyze data.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 620 (e.g., working in connection with the operating system 679) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of offering vehicle insurance for a vehicle, the method comprising:
    receiving, within a time period, (1) a first set of usage information associated with the vehicle from a first sensor device at a first location and (2) a second set of usage information associated with the vehicle from a second sensor device at a second location;
    calculating, by a processor, a distance traveled by the vehicle based on the first set of usage information and the second set of usage information;
    determining, by the processor, a vehicle usage unit based on the distance traveled; and
    providing, to a customer associated with the vehicle, an option to purchase an insurance policy based at least in part on the vehicle usage unit.

2. The computer-implemented method of claim 1, wherein providing the option to purchase the insurance policy comprises:
    identifying at least one coverage type for the vehicle; and
    communicating the at least one coverage type to the customer, wherein each of the at least one coverage type identifies a policy rate that is based at least in part on the vehicle usage unit.

3. The computer-implemented method of claim 1, wherein providing the option to purchase the insurance policy comprises:

providing the option to purchase the insurance policy to one of an existing customer or a potential customer.

4. The computer-implemented method of claim 3, further comprising:
receiving a selection of an amount of vehicle usage units from the customer, wherein each of the vehicle usage units is available for purchase at the policy rate; and
facilitating a purchase transaction with the customer for the insurance policy for the amount of the vehicle usage units.

5. The computer-implemented method of claim 1, wherein providing the option to purchase the insurance policy comprises:
identifying an existing insurance policy associated with the customer;
providing, to the customer, an option to supplement the existing insurance policy with the insurance policy based at least in part on the vehicle usage unit.

6. The computer-implemented method of claim 1, wherein receiving the first set of usage information and the second set of usage information comprises:
receiving (1) the first set of usage information at a beginning of the time period and (2) the second set of usage information at an end of the time period.

7. The computer-implemented method of claim 1, wherein receiving the first set of usage information and the second set of usage information comprises:
receiving a first image from the first sensor;
performing an optical character recognition technique on the first image to identify a license plate of the vehicle;
receiving a second image from the second sensor; and
performing the optical character recognition technique on the second image to identify the license plate.

8. The computer-implemented method of claim 1, wherein providing the option to purchase the insurance policy comprises:
providing the option to purchase the insurance policy to an electronic device associated with the customer.

9. The computer-implemented method of claim 1, wherein providing the option to purchase the insurance policy comprises:
providing the option to purchase the insurance policy to an on-board device in the vehicle.

10. The computer-implemented method of claim 1, wherein determining the vehicle usage unit comprises:
determining at least one of a distance-based vehicle usage unit that is based on the distance traveled and a time-based vehicle usage unit that is based on both the distance traveled and the time period.

11. A system for offering vehicle insurance for a vehicle, comprising:
a communication module adapted communicate data;
a memory adapted to store non-transitory computer executable instructions; and
a processor adapted to interface with the communication module, wherein the processor is configured to execute the non-transitory computer executable instructions to cause the processor to:
receive, via the communication module within a time period, (1) a first set of usage information associated with the vehicle from a first sensor device at a first location and (2) a second set of usage information associated with the vehicle from a second sensor device at a second location,
calculate a distance traveled by the vehicle based on the first set of usage information and the second set of usage information,
determine a vehicle usage unit based on the distance traveled, and
provide, to a customer associated with the vehicle via the communication module, an option to purchase an insurance policy based at least in part on the vehicle usage unit.

12. The system of claim 11, wherein to provide the option to purchase the insurance policy, the processor is configured to:
identify at least one coverage type for the vehicle, and
communicate, via the communication module, the at least one coverage type to the customer, wherein each of the at least one coverage type identifies a policy rate that is based at least in part on the vehicle usage unit.

13. The system of claim 11, wherein the customer is one of an existing customer or a potential customer.

14. The system of claim 13, wherein the processor is configured to execute the non-transitory computer executable instructions to further cause the processor to:
receive, via the communication module, a selection of an amount of vehicle usage units from the customer, wherein each of the vehicle usage units is available for purchase at the policy rate, and
facilitate a purchase transaction with the customer for the insurance policy for the amount of the vehicle usage units.

15. The system of claim 11, wherein to provide the option to purchase the insurance policy, the processor is configured to:
identify an existing insurance policy associated with the customer;
provide, to the customer via the communication module, an option to supplement the existing insurance policy with the insurance policy based at least in part on the vehicle usage unit.

16. The system of claim 11, wherein to receive the first set of usage information and the second set of usage information, the processor is configured to:
receive, via the communication module, (1) the first set of usage information at a beginning of the time period and (2) the second set of usage information at an end of the time period.

17. The system of claim 11, wherein to receive the first set of usage information and the second set of usage information, the processor is configured to:
receive, via the communication module, a first image from the first sensor,
perform an optical character recognition technique on the first image to identify a license plate of the vehicle,
receive, via the communication module, a second image from the second sensor, and
perform the optical character recognition technique on the second image to identify the license plate.

18. The system of claim 11, wherein to provide the option to purchase the insurance policy, the processor is configured to:
provide, via the communication module, the option to purchase the insurance policy to an electronic device associated with the customer.

19. The system of claim 11, wherein to provide the option to purchase the insurance policy, the processor is configured to:
provide, via the communication module, the option to purchase the insurance policy to an on-board device in the vehicle.

20. The system of claim 11, wherein to determine the vehicle usage unit, the processor is configured to:

determine at least one of a distance-based vehicle usage unit that is based on the distance traveled and a time-based vehicle usage unit that is based on both the distance traveled and the time period.

* * * * *